Oct. 7, 1947. G. A. TINNERMAN Re. 22,926

FASTENING DEVICE

Original Filed June 26, 1942

Inventor

George A. Tinnerman,

By Bair, Tear & McBean,

Attorneys

Reissued Oct. 7, 1947 Re. 22,926

UNITED STATES PATENT OFFICE 22,926

FASTENING DEVICE

George A. Tinnerman, Cleveland, Ohio, assignor to Tinnerman Products, Inc., Cleveland, Ohio, a corporation of Ohio Original No. 2,399,958, dated May 7, 1946, Serial No. 522,558, February 16, 1944, which is a division of Serial No. 448,592, June 26, 1942. Application for reissue October 11, 1946, Serial No. 702,565

6 Claims. (Cl. 85—32)

This application is a division of my application 448,592, filed June 26, 1942, now Patent No. 2,399,957, issued May 7, 1946, which patent is a continuation in part of prior application 340,203 filed June 12, 1940, now Patent 2,326,-903, issued August 17, 1943.

The present invention relates to a fastening device having two spaced portions substantially parallel with each other and connected adjacent one end while open at the other end, so that the device may be slid in its own plane over the edge of a support and coact with both faces thereof, one of the portions being provided with a hollow projection extending toward the plane of the other portion which provides an indexing device adapted to enter an opening in the support to locate the fastener on the support and provides also a nut to engage the threads of a screw passing through the opening in the support and beyond the plane of said other portion of the fastener.

One application of my invention relates to a fastening device for screw threaded shafts for use where it is desired to effect a helical engagement in a thread groove as a nut and also to maintain a frictional engagement with the crests of the thread. The invention is especially useful in connection with various instruments having screw-threaded adjustments, for instance, tuning or similar devices in radio apparatus. Such instruments frequently include a coil form or the like and an adjusting screw providing for axial adjustment of the tuning core within the coil form.

My invention provides in a simple manner a fastening device which may embrace a support and automatically position itself thereon and at the same time provide a nut for a screw to pass through the support, and in the adaptation above-mentioned provides also for maintaining a frictional engagement with the crests of the threaded adjusting screw, preventing its jarring loose. Where the screw carries an electric current, my frictional clamp is of further advantage in preventing leakage or irregularities from movement of the screw in the nut. My invention is particularly useful in radio apparatus mounted on automobiles or other locations where it is subjected to constant vibration, tending to disturb the adjustment and interfere with the reception.

To the above ends, I have provided a simple device which furnishes at once a nut by means of warped edges engaging in the groove of the thread and spring tongues projecting from the same device, but positioned so as not to interfere with the nut members, extending parallel with the axis of the screw and engaging crests of its threads to maintain a friction tight engagement therewith.

Figure 1:
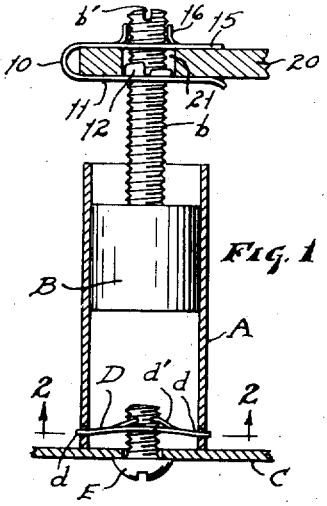
Figure 3:
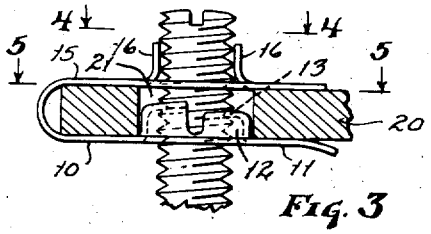
Figure 4:
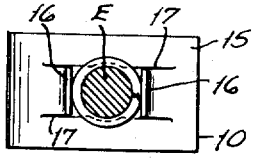
Figure 2:
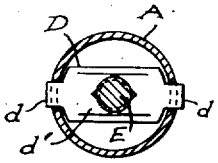
Figure 5:
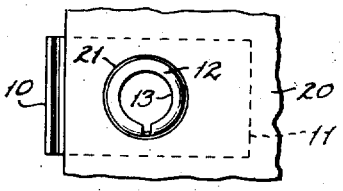

In the drawing, Fig. 1 is a sectional elevation of an instrument mounting embodying one form of my fastening device; Fig. 2 is a section taken on the line 2—2 on Fig. 1; Fig. 3 is an enlarged view of the mounting for the adjusting screw shown in Fig. 1; Fig. 4 is a sectional plan of the mounted fastener shown in Fig. 3; Fig. 5 is a sectional plan showing the lower arm of the fastener of Fig. 3 in position, the plane of the section being just below the upper arm, as indicated by the line 5—5 on Fig. 3.

As shown in Fig. 1, A illustrates a coil or other instrument in the form of a cylinder housing a tuning core B which has an axially extending threaded operating shaft *b*. The cylinder A is held on a suitable support C in any suitable manner.

I have shown the instrument anchored to the support by means of a bridge piece D having reduced ends *d* occupying openings in the cylinder and having a screw-receiving central opening with oblique tongues *d'* on the opposite sides thereof. These tongues are cut from the body of the strip and bent upwardly and notched and warped at their edges, so as to be able to engage a screw thread, and act as a nut therefor. Such a screw is indicated at E in Fig. 1 and by screwing upwardly through the support C into the bridge piece, it locks the cylinder to the support in a very simple manner, as clearly indicated in Figs. 1 and 2.

The screw shaft *b* of Fig. 1 is shown as having a screw driver slot *b'* in its upper end. Accordingly, by providing a supporting nut for it the core B may be readily moved axially in the cylinder. However, support by an ordinary nut is not satisfactory, where an accurate adjustment should be maintained, especially if the instrument is liable to receive vibration. My device, about to be described, and as hereinbefore outlined, not only provides the nut but also frictional engagement for maintaining a tight connection.

As shown in Figs. 1 and 3, 10 indicates my combined nut and frictional engager, shown as a strip doubled into a U-shape and snugly embracing a supporting arm 20. Each arm of the U has an opening for the passage of the threaded shank *b*. One of the arms, preferably the lower arm 11, is equipped with warped surfaces about the opening to engage within the thread groove and act as a nut. As shown, this warped surface comprises an upstanding inwardly flanged nearly annular portion 12, the edge 13 of which forms a nearly complete helical turn, as shown, especially in Figs. 3 and 5.

On opposite sides of the opening through the upper arm 15, I provide a pair of parallel flat tongues 16 which are formed from the body of this arm by parallel slits 17. These tongues lie on diametrically opposite sides of the screw threaded shaft and extend nearly at right angles to the arm but normally converge slightly so as to form a friction-tight engagement with the crests of the threads, as shown particularly in Figs. 1, 3 and 4.

The combined nut and frictional retainer above described, may be mounted on the supporting plate 20 simply by spreading the arms of the fastener apart, shoving it over the edge of the support until the upstanding helical portion 12 extends into the opening 21 made in the support for this purpose. This effectively positions the fastening device on the support and provides at once the nut and the spring acting friction engagers to press against the crests of the threaded shaft.

By the means described, I not only support the threaded shaft by a nut but at the same time I provide sufficient friction so that the shaft will not become displaced from the jarring but will maintain its position until it is intentionally changed by being rotated. The friction tongues 16 hold the shaft against any inadvertent displacement. They may also be availed of whenever desired for maintaining a tight electric connection between the supporting member 20 and the shaft. This is of special value in some types of radio apparatus.

It will be seen that my fastening device may be made of a single strip of resilient sheet material simply by cutting and bending operations. The device provides a passageway for a threaded bolt and may have two sets of engaging devices coacting with such bolt, one set serving to locate the device on the support and by occupying the thread groove of the bolt to act as a nut, the other set engaging crests of the bolt thread to hold the bolt frictionally against vibration or displacement in the nut. Where the prevention of vibration is not important, the latter set may be omitted.

I claim:

1. A fastening device comprising a strip of sheet material doubled on itself in the U-form, a nut carried by one arm of the fastener and extending toward the other arm and means on the other arm to frictionally press against the crest of the thread of a bolt carried by the nut arm.

2. A fastener comprising a U-shaped strip of metal having a pair of parallel arms, aligned openings through the two arms, the metal of one of the arms being distorted toward the other arm to provide an upstanding helical edge between the arms, and the other arm carrying opposed spring tongues, each frictionally engaging a plurality of crests of the thread of the bolt occupying the openings.

3. A U-shaped fastener having its arms adapted to frictionally engage the top and bottom of a support, one arm of the fastener being provided with an opening and an upward and inwardly extending helical flange about the opening, said flange being adapted to occupy the opening of the support, and the other arm of the fastener having an opening and a pair of diametrically opposed tongues on opposite sides of the opening extending at approximately right angles to that arm but slightly converging to lie with spring pressure against a plurality of crests of a bolt threaded through the nut of the first arm.

4. A one-piece fastener of sheet material comprising a base portion having an opening for the passage of a threaded shank, and a top portion formed by bending the base portion upwardly and inwardly to present a portion overlying the base portion and spaced therefrom, the top portion surrounding the shank and having an opening registering with the opening of the base, the material of the top portion being diverted on opposite sides of the shank to provide projecting portions adapted to frictionally engage the crest of the thread without acting as a nut, the material of the base portion being diverted upwardly and warped to act as a nut.

5. A one-piece sheet metal fastening device comprising a sheet metal body defining a pair of arms extending in the same general direction in spaced relation and adapted to receive an apertured part therebetween, one of said arms having a bolt or screw opening and integral thread engaging means adjacent said opening carried by an integral projection pressed inwardly out of the plane of said arm and lying entirely between said pair of arms, said integral projection being receivable in the aperture in said part to retain the fastener in applied fastening position thereon for receiving a bolt or screw threaded with said integral thread engaging means.

6. A one-piece sheet metal fastening device comprising a sheet metal body defining a pair of arms extending in the same general direction in spaced relation and adapted to receive an apertured part therebetween, one of said arms having a bolt or screw opening and integral thread engaging means adjacent said opening carried by an integral hollow protuberance pressed inwardly out of the plane of said arm and lying entirely between said pair of arms, said hollow protuberance being receivable in the aperture in said part to retain the fastener in applied fastening position thereof for receiving a bolt or screw threaded with said integral thread engaging means.

GEORGE A. TINNERMAN.

REFERENCES CITED

The following references are of record in the file of this patent:

UNITED STATES PATENTS

| Number | Name | Date |
|---|---|---|
| 2,101,287 | Tinnerman | Dec. 7, 1937 |
| 2,201,401 | Jones | May 21, 1940 |
| 2,278,790 | Langmaid | Apr. 7, 1942 |
| 2,399,958 | Tinnerman | May 7, 1946 |